United States Patent [19]

Moulin

[11] Patent Number: 4,820,185

[45] Date of Patent: Apr. 11, 1989

[54] ANTI-BACKLASH AUTOMATIC LOCKING CONNECTOR COUPLING MECHANISM

[75] Inventor: Norbert L. Moulin, Placentia, Calif.

[73] Assignee: Hughes Aircraft Company, Los Angeles, Calif.

[21] Appl. No.: 145,869

[22] Filed: Jan. 20, 1988

[51] Int. Cl.⁴ ............................................. H01R 13/62
[52] U.S. Cl. .................................. 439/321; 350/96.21
[58] Field of Search .................. 439/318, 321; 285/82, 285/84, 86; 350/96.21

[56] References Cited

U.S. PATENT DOCUMENTS

| | | | |
|---|---|---|---|
| 815,627 | 3/1906 | Oldham | 285/84 |
| 1,159,567 | 11/1915 | Burton . | |
| 2,690,542 | 9/1954 | Pearce et al. . | |
| 3,129,993 | 4/1964 | Ross . | |
| 3,300,042 | 1/1967 | Gordon | 267/157 |
| 3,685,004 | 8/1972 | Kerr . | |
| 3,855,566 | 12/1974 | Richardson . | |
| 3,917,373 | 11/1975 | Peterson | 285/82 |
| 4,037,902 | 7/1977 | Miller . | |
| 4,285,564 | 8/1981 | Spinner | 439/321 |
| 4,477,140 | 10/1984 | Espiritu . | |
| 4,508,407 | 4/1985 | Ball . | |
| 4,525,017 | 6/1985 | Schildraut et al. . | |
| 4,595,251 | 6/1986 | Moulin . | |

FOREIGN PATENT DOCUMENTS

943983 3/1949 France .
2040113 8/1980 United Kingdom .

Primary Examiner—Eugene F. Desmond
Attorney, Agent, or Firm—Joseph E. Szabo; Anthony W. Karambelas

[57] ABSTRACT

A coupling mechanism (11) comprising a receptacle (13) having an open cavity (31) therein, a plug (15) receivable in the cavity (31), and a rotatable coupling member (17) drivingly coupled to the plug (15) and coupling the plug (15) to the receptacle (13). A locking member (19) is mounted on the coupling member (17) for rotation with the coupling member (17) and for translation relative to the coupling member (17). A spring (21) acts between the locking member (19) and the coupling member (17) and urges the locking member (19) to translate with the coupling member (17). Translation of the locking member (19) is limited so that the spring (21) is compressed to store energy. A cam track (33) and a cam follower (105) have interlocking members which are driven into interlocking relationship by the stored energy in the spring (21) when the locking member (19) and the receptacle (13) are in a predetermined angular position relative to each other. The interlocking members retain the locking member (19) rotation relative to the receptacle (13).

23 Claims, 5 Drawing Sheets

ANTI-BACKLASH AUTOMATIC LOCKING CONNECTOR COUPLING MECHANISM

BACKGROUND OF THE INVENTION

1. Field of the Invention

This invention relates to an automatic locking connector coupling mechanism of the type which is particularly adapted, but not limited to, the coupling of optical fibers.

2. Description of Related Art

It is often necessary to couple electrical conductors or optical fibers. This can be accomplished, for example, by utilizing a plug and a receptacle and a coupling member to couple the plug to the receptacle. The plug and receptacle carry aligned electrical conductors or optical fibers so that the coupling mechanism can electrically or optically couple the conductors or fibers, as the case may be.

In an effort to prevent decoupling, it is common practice to provide a lock or detent to inhibit unlocking motion of the coupling member. For example, one optical fiber coupling mechanism uses a lock wire to maintain mating integrity of the coupling mechanism. This is undesirable because of the time required to lock and release the coupling mechanism using the lock wire.

Other coupling mechanisms use a bayonet arrangement and a spring. This type of coupling mechanism allows separation of the coupling mechanism interface when a force greater than that generated by the spring is applied. While this may be permissible for some electrical coupling mechanisms, it cannot be tolerated in an optical fiber coupling mechanism because of the signal change that is produced as a result of interface separation.

Friction devices have also been used in an effort to prevent accidental decoupling of the coupling mechanism. However, friction devices tend to wear relatively fast.

SUMMARY

This invention provides a coupling mechanism which generally overcomes these disadvantages. The coupling mechanism of this invention positively locks the coupling mechanism against interface separation, and consequently, axial tensile forces acting on the coupling mechanism will not result in interface separation. Furthermore, the coupling mechanism of this invention locks automatically and can be unlocked by predetermined sequential movements so that the coupling mechanism is easy to use.

This invention uses energy stored in a spring to lock the coupling mechanism against decoupling. The energy is stored in the spring as a result of manipulating the components of the coupling mechanism to couple a plug and receptacle. After the coupling mechanism is locked, axial forces alone cannot bring about separation of the interface of the coupling mechanism.

This invention can be embodied in a coupling mechanism which includes a receptacle or receptacle element having an open cavity and a plug or plug element receivable in the cavity. A rotatable coupling member is drivingly coupled to the plug and receptacle, and the coupling member couples the plug to the receptacle in response to rotation of the coupling member.

The unique features of the invention relate primarily to means for locking the coupling member against motion that would bring about decoupling of the plug and the receptacle. This can be implemented by utilizing a locking member mounted for rotation with the coupling member and for translation relative to the coupling member. A resilient member acts between the locking member and the coupling member and urges the locking member to translate with the coupling member. Cooperating means on the locking member and the receptacle limit the translation of the locking member so that the resilient member is deflected by the rotation of the coupling member and the locking member. Accordingly, the cooperating means and the rotation of the coupling member and the locking member combine to deflect the resilient member so that energy is stored in the resilient member.

The cooperating means also includes interlocking means on the locking member and one of the plug and the receptacle. The interlocking means automatically interlocks in response to the stored energy in the resilient member and the locking member and such one of the plug and receptacle being in a predetermined relative angular position. This interlocking retains the locking member and coupling member against rotation relative to such one of the plug and the receptacle so that the coupling mechanism cannot be unintentionally decoupled.

With this construction, axial tensile forces on the plug and receptacle cannot bring about separation of the interface. Rather, to decouple the coupling mechanism, it is necessary to first apply an axial retraction force to the locking member sufficient to overcome the force of the resilient member and, with the locking member axially retracted, rotate the locking member and coupling member in the proper direction to bring about a loosening of the coupling member. Accordingly, unless this unlocking combination is employed, the coupling mechanism will not decouple.

Another feature of this invention is that the stored energy in the spring is used to impart additional tightening rotation to the locking member and coupling member in response to the interlocking of the locking means. This automatically applies a preloading force to the optical fibers, conductors or other members carried by the plug and receptacle. This preloading force helps prevent separation of the interface by shock, vibration or thermal cycling. This preload generates a separating force at the interface of the coupling mechanism that must be restrained by the coupling mechanism.

Although the resilient member can be compressed in different ways, this can advantageously be brought about by employing a cam track and a cam follower which are urged together by the resilient member. One of the cam track and the cam follower is on the locking member, and the other of the cam follower and the cam track is on either the plug or the receptacle. The cam track has a resilient member deflection section which is configured to bring about deflection of the resilient member as the coupling member and locking member are rotated. More particularly, this resilient member deflection section inhibits, to some desired degree, the translation of the locking member with the coupling member to bring about deflection of the resilient member and the consequent storing of energy.

Preferably, the cam track and cam follower are also configured to provide the interlocking means. In a preferred construction, the interlocking means includes at least one recess on the cam track and at least one projection on the cam follower, and by urging the projection into the recess at a predetermined angular position, the locking member and the coupling member are locked against rotational movement at least in a direction which would allow decoupling of the plug and receptacle. The additional tightening rotation of the coupling member can also be provided by appropriately configuring the projection and the recess to include, for example, an inclined cam surface partly defining the recess.

The invention, together with additional features and advantages thereof, may best be understood by reference to the following description taken in connection with the accompanying illustrative drawing.

DESCRIPTION OF THE PREFERRED EMBODIMENTS

Figure 1:
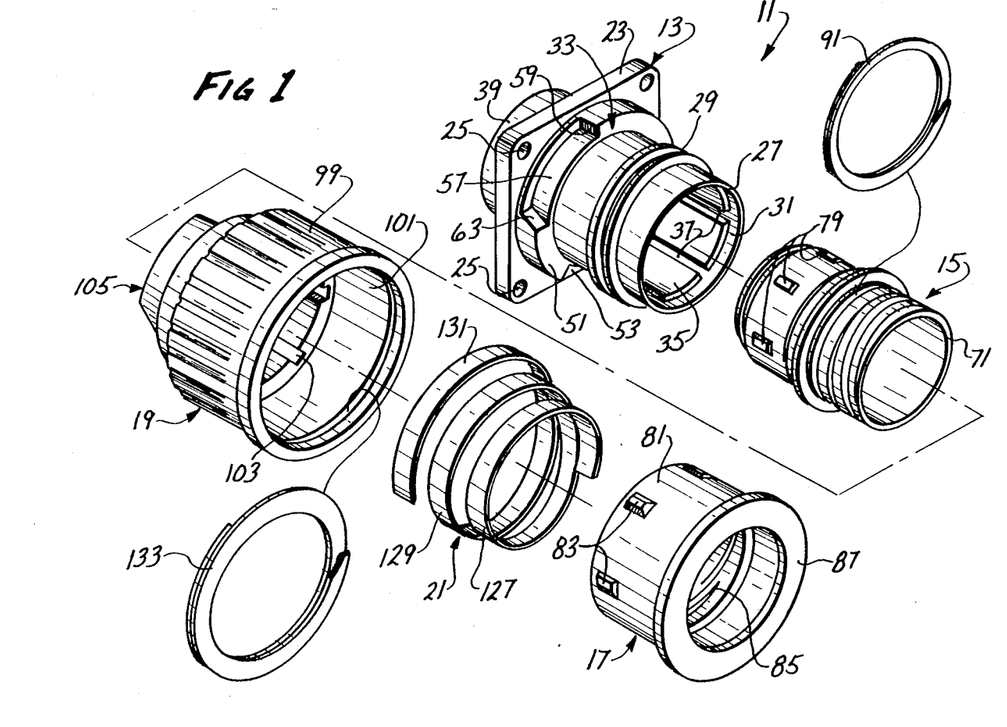
FIG. 1 is an exploded isometric view of a coupling mechanism constructed in accordance with the teachings of this invention.
Figures 2, 3:
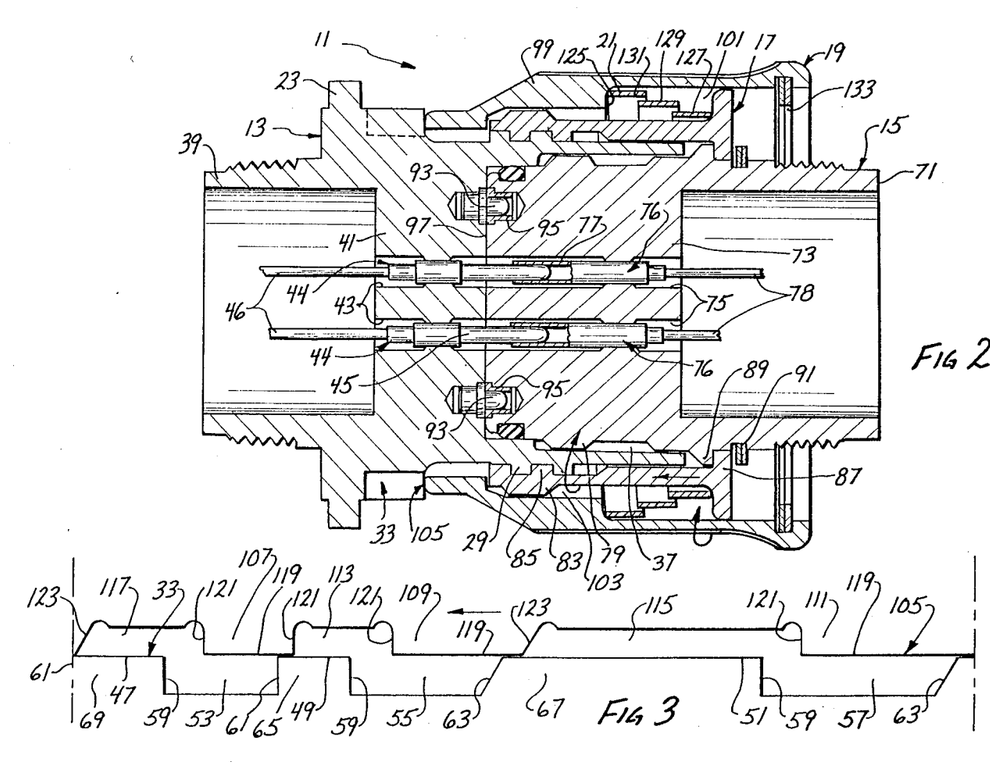
FIG. 2 is an axial sectional view through the coupling mechanism with the locking member unlocked and the resilient member compressed.
FIG. 3 is an illustration showing the cam and cam track laid out flat and in a position corresponding to the position of the components in FIG. 2.

Referring now to the drawings in more detail, FIGS. 1 and 2 show a coupling mechanism 11 which comprises a receptacle or receptacle element 13, a plug or plug element 15, a coupling member 17, a locking member 19, and a resilient member in the form of a coil compression spring 21. Although the receptacle 13 can be of various different constructions, in this embodiment, it includes a base or mounting plate 23 having mounting holes 25 for mounting the base 23 on external structure (not shown), a sleeve 27 having external screw threads 29 and defining an open-ended cavity 31 and an annular cam track 33 mounted on, or integral with, the base 23 and extending around the inner end of the sleeve. Circumferentially spaced ribs 35 on the inner wall of the sleeve 27 define circumferentially spaced axially extending slots 37 in the cavity 31.

The receptacle 13 has an externally threaded socket 39 (FIGS. 1 and 2) coaxial with the sleeve 27 and separated from the sleeve by a transverse wall 41 (FIG. 2). The transverse wall 41 has one or more passages 43 for receiving and retaining various members, such as pin terminus assemblies 44, or which may be left open for the passage of, for example, a fluid. The pin terminus assemblies 44 may be conventional, and each of them includes a pin 45 projecting from the wall 41. Optical fibers 46 are coupled to the assemblies 44 in a known manner and project in the other direction from the wall 41.

The cam track 33 as shown in FIGS. 1 and 3 comprises resilient member deflection sections 47, 49 and 51 separated circumferentially by recesses 53, 55 and 57. Although various constructions are possible, in this embodiment, the sections 47, 49 and 51 are coplanar, lie in a radial plane and represent raised portions of the cam track 33.

The cam track 33 has three axial surfaces 59 which define, respectively, one end of the recesses 53, 55 and 57. An axial surface 61 defines the other end of the recess 53. The other ends of the recesses 55 and 57 are defined by inclined cam surfaces 63. The cam track 33 defines projections 65, 67 and 69 between adjacent recesses 53, 55 and 57.

Figure 6:
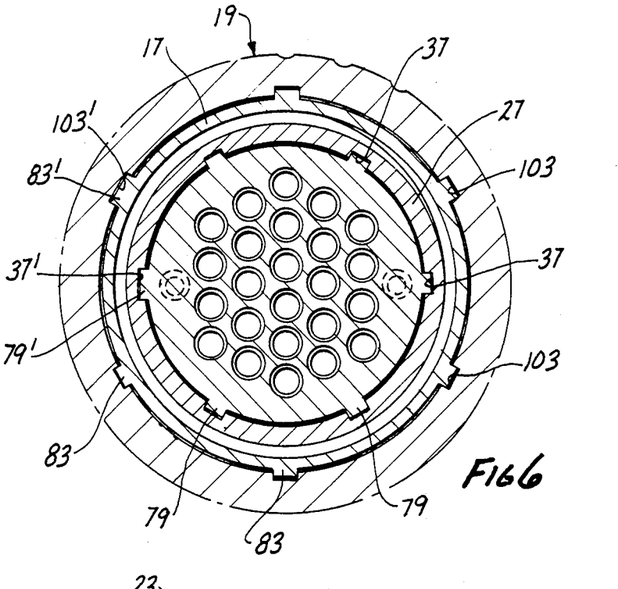
FIGS. 6 and 7 are sectional views taken generally along lines 6—6 and 7—7, respectively, of FIG. 4.

The plug 15 has an externally threaded socket 71 (FIGS. 1 and 2) and a transverse wall 73 (FIG. 2) with one or more passages 75 for receiving and retaining conventional identical socket terminus assemblies 76, or which may be left open for the passage of fluid. Each of the socket terminus assemblies 76 includes a socket 77 for receiving the pin 45 and is attached to an optical fiber 78. A series of short splines 79 is arranged on the exterior of the plug 15 in circumferentially spaced relationship. The plug 15 is sized, and the splines 79 are sized and arranged so that the plug can be received within the cavity 31 of the receptacle 13, with the splines 79 being received, respectively, in the slots 37. To assure that the angular relationship between the receptacle 13 and the plug 15 is correct, one of the slots 37' (FIG. 6) and one of the splines 79' are wider circumferentially than the other slots and splines. Accordingly, the spline 79' must be received in the slot 37', and this assures correct "clocking" of the plug 15 in the receptacle 13. With the plug 15 received in the receptacle 13 as shown in FIGS. 2 and 6, the passages 43 are in axial alignment with the passages 75, respectively, and the pins 45 are received in the sockets 77, respectively, to thereby provide accurate alignment and optical coupling of the optical fibers 46 and 78.

The coupling member 17 performs a number of important functions, including the important function of coupling the plug 15 to the receptacle 13. The coupling member 17 (FIGS. 1 and 2) is annular and has an essentially cylindrical peripheral wall 81 with a series of circumferentially spaced, external splines 83 on the outer surface of the peripheral wall, internal threads 85 on the peripheral wall and an annular flange 87 at one end of the peripheral wall.

The coupling member 17 is mounted on the plug 15 for relative rotational movement. Although this can be accomplished in various ways, in this embodiment, a radially inwardly projecting portion of the flange 87 is received between a shoulder 89 of the plug 15 and a retaining ring 91 as shown in FIG. 2. The other end of the coupling member 17 is attachable to the receptacle 13 by virtue of the cooperation between the threads 29 and 85. Accordingly, by tightening of the threads 29 and 85, the coupling member 17 can tightly couple the plug 15 to the receptacle 13 with the passages 43 and 75 in axial alignment, respectively. Of course, the threads 29 and 85 can be replaced with various other means, such as a pin and slot or lugs and grooves, which are responsive to relative rotation between the coupling member 17 and the receptacle 13 for translating the coupling member on the receptacle and coupling the plug 15 to the receptacle. Proper axial alignment of the passages 43 and 75, respectively, can be further assured by the use of guide pins 93 carried by the transverse wall 41 being received in guide bushings 95, respectively, carried by the transverse wall 73. Of course, the coupling member 17 can be rotatably mounted on the receptacle 13 and threadedly attached to the plug 15, if desired.

If the coupling member 17 were to counterrotate, it would loosen the coupling of the receptacle 13 to the plug 15 and tend to separate the interface 97 where the transverse walls 41 and 73 meet and where the pins 45 are held in engagement with the sockets 77. To prevent this, the locking member 19, the spring 21 and the cam track 33 are provided. The locking member 19 is a tubular member having a peripheral wall 99, with a passage 101 extending through it, and the coupling member 17 is received in the passage 101, with the spring 21 lying between the locking member and the coupling member. The peripheral wall 99 has internal circumferentially spaced, axially extending slots 103 for slidably receiving the splines 83, respectively, as shown in FIG. 6. to thereby couple the locking member to the coupling member for rotation together and for relative translation, which in this embodiment, is relative axial movement. One of the slots 103' and the associated spline 83' are slightly larger circumferentially to thereby angularly orient the locking member 19 and the coupling member 17.

As shown in FIG. 2, the locking member 19 has an end portion which extends beyond the coupling member 17 and terminates in a cam follower 105 at an end of the locking member. The configuration of the cam follower 105 is shown laid out flat in FIG. 3, and it comprises projections 107, 109, and 111 separated circumferentially by recesses 113, 115 and 117. Each of the projections 107 has a cam follower surface 119 which lies in a radial plane. An axial surface 121 defines the opposite ends of the projection 107 and one end of the projections 109 and 111. The opposite ends of the projections 109 and 111 are defined by an inclined cam follower surface 123.

The spring 21 acts between the locking member 19 and the coupling member 17 and urges the locking member to translate with the coupling member. In this embodiment, the spring 21 engages a radially outwardly projecting portion of the flange 87 of the coupling member 17 and an internal annular shoulder 125 (FIG. 2) of the locking member.

Although the spring 21 could have various different cross sections, preferably it is constructed of flat wire having a plurality of windings 127, 129 and 131 of progressively increasing diameter so that, when compressed, each of the windings can be at least partially received within an adjacent winding. In this embodiment, when fully compressed, the spring 21 is in a spiral configuration with all of the windings being in radial alignment. A spring of this type allows for greater compression for a given unstressed length of the spring and, therefore, contributes to compactness.

The end of the locking member 19 opposite the cam follower 105 carries a retaining ring 133 (FIGS. 1 and 2). This retaining ring 113 limits expansion of the spring 21 in the position of FIG. 4.

With the components of the coupling mechanism 11 assembled as shown in FIG. 2, the spring 21 acts between the coupling member 19 and the locking member 17 to resiliently bias the locking member to the left as viewed in FIG. 2 so that the cam follower 105 is urged against the cam track 33. More specifically, the cam follower surfaces 119 slide along the sections 47, 49 and 51 of the cam track 33 as the locking member 19 and the coupling member 17 are rotated as a unit. As rotation of the members 17 and 19 continues, the threads 29 and 85 cooperate to draw the plug 15 more tightly into the receptacle 13. Rotation of the members 17 and 19 also translates the coupling member 17 axially along the plug 15, but translation of the locking member 19 is prevented by virtue of the sliding contact between the cam follower surfaces 119 and the sections 47, 49 and 51 of the cam track 33. Accordingly, the spring 21 is deflected, and in this embodiment, is compressed by rotation of the coupling member 17 and the locking member 19 to store energy in the spring 21. More specifically, the sections 47, 49 and 51 of the cam track 33 are configured to bring about compression of the spring 21 by virtue of, in this embodiment, not allowing the locking member 19 to translate with the coupling member 17.

When the members 17 and 19 are rotated in the direction of the arrow in FIG. 3 slightly beyond the position shown in FIG. 3, the projections 107, 109 and 111 are axially aligned with the recesses 53, 55 and 57, respectively, and can be urged into these recesses by the energy stored in the spring 21. This automatically locks the locking member 19 and the coupling member 17 against counterrotational movements that would decouple the coupling mechanism 11. The projections 107, 109 and 111 and the corresponding recesses 53, 55 and 57 comprise interlocking means which are responsive to the stored energy in the spring 21 and to the locking member 19 and the receptacle 13 being in a predetermined relative angular position to interlock to retain the locking member 19 and, hence, the coupling member 17 against rotation relative to the receptacle 13. Similarly, the projections 65, 67 and 69 and the associated recesses 113, 115 and 117 also form part of the interlocking means. Of course, the threads 29 and 85, the angular orientation of the locking member 19 and coupling member 17, and the cam track 33 and the cam follower 105 are constructed and arranged so that the threads 29 and 85 are tight, and the plug 15 is tightly held in the cavity 31 as shown in FIG. 2 when the projections 107, 109 and 111 enter their respective recesses.

Figure 5:
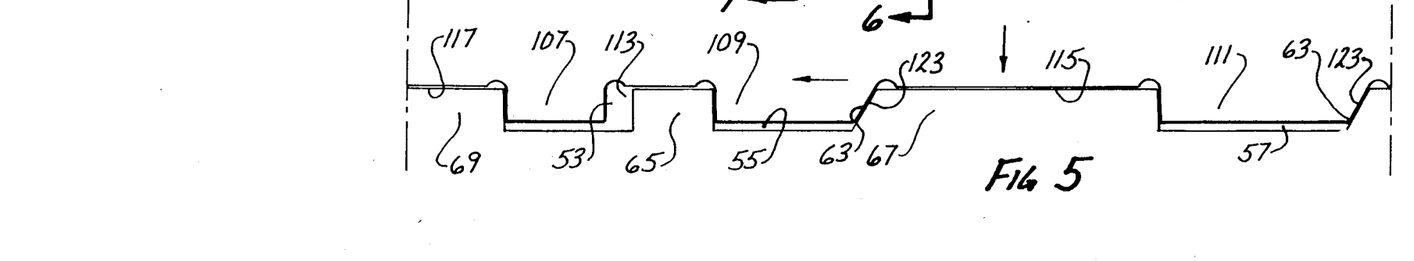
FIG. 5 is a view similar to FIG. 3 showing the relative positions of the cam and cam track when the components are in the position of FIG. 4.
Figure 7:
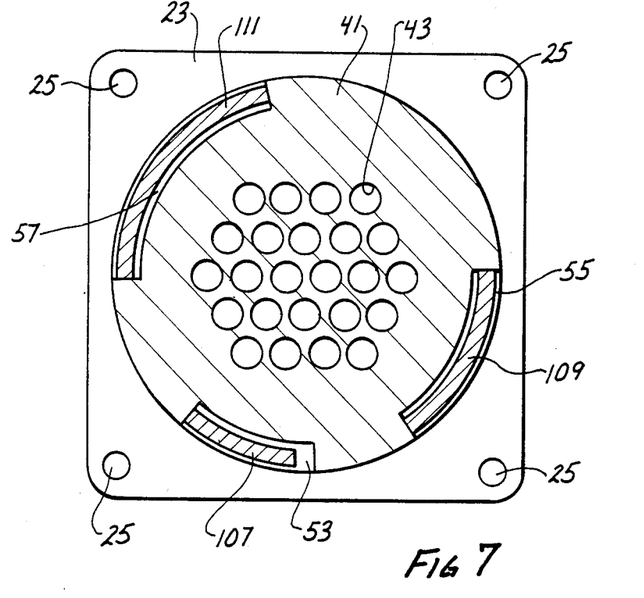

As shown in FIGS. 5 and 7, the projection 107 is circumferentially shorter than the associated recess 53, but the projections 109 and 111 fit relatively snugly within the associated recesses 55 and 57. Similarly, the projection 65 fits loosely within the recess 113, and the projections 67 and 69 fit more snugly within the associated recesses 117 and 115.

Another feature of the invention is that the cam surfaces 63 cooperate with the inclined follower surfaces 123 to impart additional rotation to the locking member 19 relative to the receptacle 13 in a direction that will tighten the coupling member 17 on the receptacle. This added bit of rotation of the coupling member 17 in a tightening direction preloads the walls 41 and 73 against each other and holds the pins 45 tightly in the sockets 77. This additional rotation occurs in response to the initiation of the interlocking of the interlocking means. The looseness of the projections 107 and 65 in their associated recesses allows this additional rotation to occur without interference that might be caused by tolerances.

With the projections 107, 109 and 111 received in the recesses 53, 55 and 57, respectively, the spring 21 expands somewhat from the position shown in FIG. 2. However, the spring 21 continues to strongly bias the projections 107, 109 and 111 into their associated recesses. The retaining ring 133 serves as a stop for the locking member 19 and limits the expansion of the spring 21 after the projections 107, 109 and 111 are pushed into their associated recesses in the cam track 33.

Figure 4:
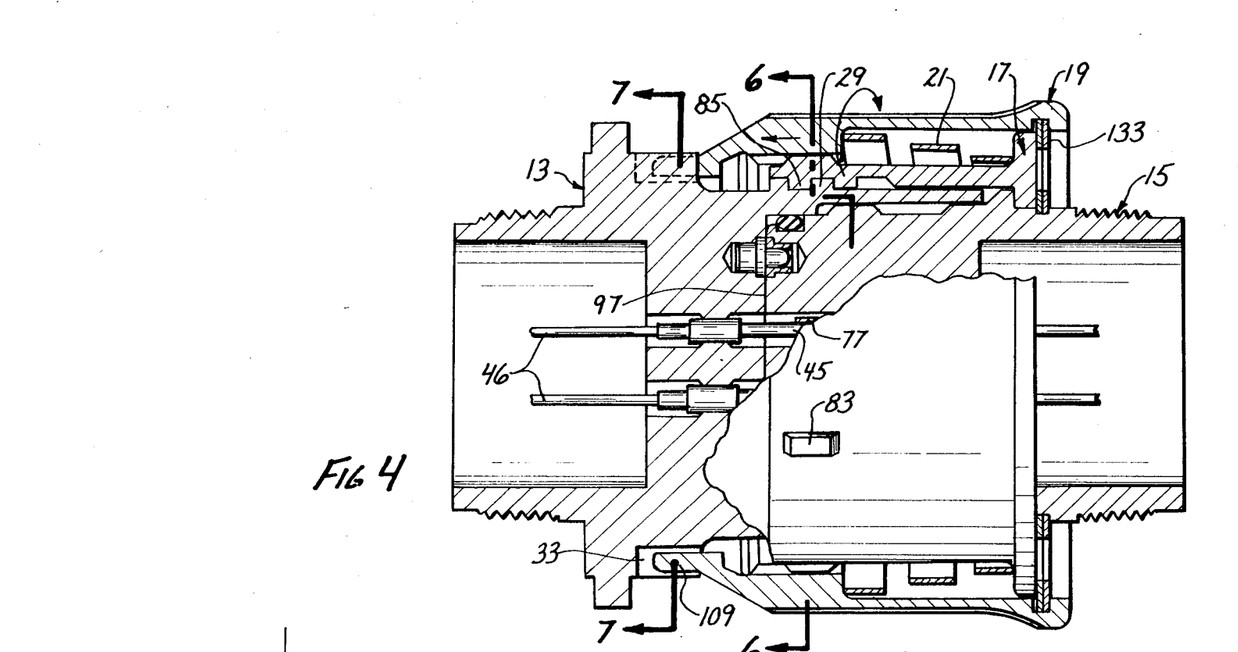
FIG. 4 is a sectional view partially in elevation similar to FIG. 2 with the locking member in the locked position.

With the coupling mechanism 11 in the position shown in FIG. 4, axial tension forces exerted on the receptacle 13 and the plug 15 are resisted by the threads 29 and 85, and so the coupling mechanism 11 cannot separate at the interface 97. Furthermore, even if the axial tension force is applied to the receptacle 13 and the locking member 19 and even if the tensile force is greater than the spring force 21, the only effect will be to withdraw the locking member 19 axially to the right as viewed in FIG. 4. If the force exists for a sufficient time, this may withdraw the projections 107, 109 and 111 from the associated recesses, but even this will not separate the coupling mechanism 11 at the interface 97 because the threads 29 and 85 prevent this.

To decouple the coupling mechanism 11, it is necessary to retract the locking member 19 against the biasing force of the spring 21 sufficiently to withdraw the projections 107, 109 and 111 from their associated recesses in the cam track 33. With the locking member 19 withdrawn in this manner, a rotational force is then applied to the locking member 19 in a direction to unscrew the threads 29 and 85. The receptacle 13 and the plug 15 can then be completely decoupled by completely unthreading the coupling member 17 from the receptacle 13.

Figure 8:
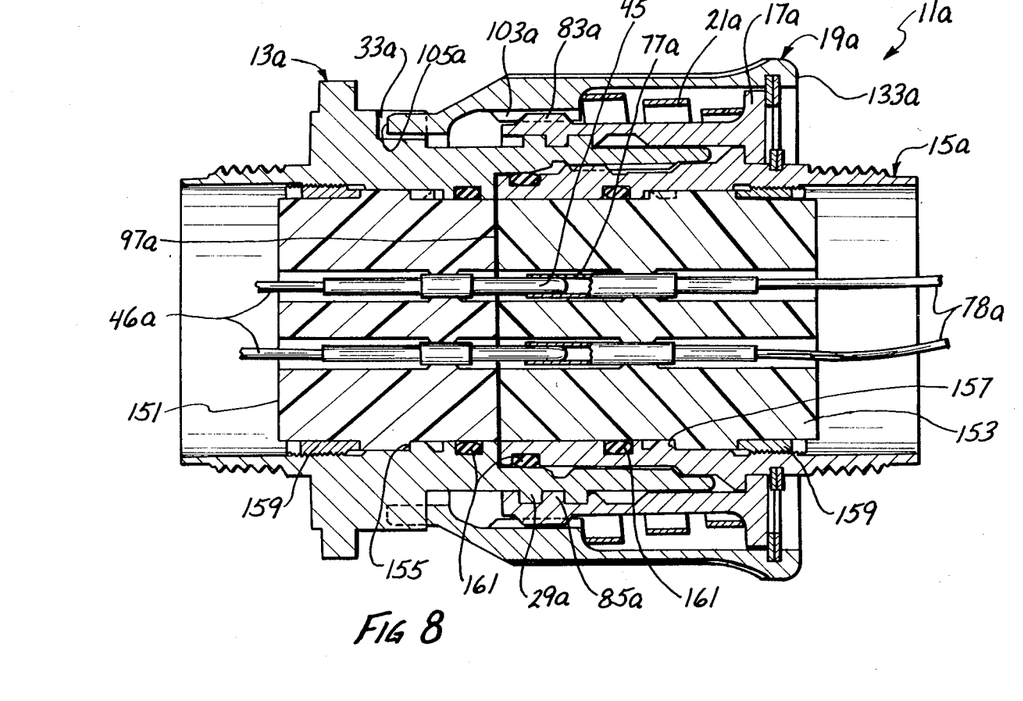
FIG. 8 is an axial sectional view through a second embodiment of coupling mechanism.

FIG. 8 shows a coupling mechanism 11a which is identical to the coupling mechanism 11 in all respects not shown or described herein. Portions of the coupling mechanism 11a corresponding to portions of the coupling mechanism 11 are designated by corresponding reference numerals followed by the letter "a."

The primary difference between the coupling mechanisms 11 and 11a is that the latter is adapted to couple electrical conductors 46a and 78a rather than the optical fibers 46 and 78. For this purpose, the transverse walls 41 and 73 of the coupling mechanism 11 are replaced by dielectric inserts 151 and 153, respectively, with these inserts being retained against shoulders 155 and 157 by threaded retaining rings 159. Annular seals 161, which may be O-rings, provide moisture protection at the interface 97a. The inserts 151 and 153 carry the pin contact assemblies 44a and socket contact assemblies 76a in a conventional manner, and an electrically conductive coupling is provided between the conductors at or adjacent the interface 97.

Although exemplary embodiments of the invention have been shown and described, many changes, modifications and substitutions may be made by one having ordinary skill in the art without necessarily departing from the spirit and scope of this invention.

What is claimed is:
1. A coupling mechanism comprising:
a receptacle element having an open cavity therein;
a plug element receivable in said cavity and held against rotation in said cavity;
a rotatable coupling member drivingly coupled to said elements, said coupling member coupling the plug element to the receptacle element in response to rotation of the coupling member;
a locking member;
means for mounting the locking member for rotation with the coupling member and for translation relative to the coupling member;
a resilient member acting between the locking member and the coupling member for urging the locking member to translate with the coupling member as the coupling member is rotated to couple the plug element to the receptacle element;
cooperating means on the locking member and one of said elements for limiting the translation of the locking member with the coupling member as the coupling member is rotated to couple the plug element to the receptacle element until a predetermined angular position of the locking member and said one element is reached whereby the resilient member is progressively compressed by the rotation of the coupling member and the locking member to store energy in the resilient member; and
said cooperating means including interlocking means on the locking member and said one element and responsive to the stored energy in the resilient member and to the locking member and said one element being in said predetermined angular position to interlock to retain the locking member against rotation relative to said one element in a direction that would allow decoupling of the receptacle element and the plug element.

2. The coupling mechanism of claim 1 including means responsive to the interlocking of the interlocking means to impart additional rotation to the locking member relative to said one element.

3. The coupling mechanism of claim 2 wherein said means to impart includes a cam surface and a cam follower surface.

4. The coupling mechanism of claim 1 wherein said cooperating means includes a cam track on one of said one element and said locking member and a cam follower on the other of said one element and said locking member, said resilient member urges said cam track and said cam follower together and said cam track has a resilient member deflection section which is configured to bring about deflection of the resilient member as the coupling member and the locking member are rotated.

5. The coupling mechanism of claim 4 wherein said interlocking means includes at least one recess on said cam track and at least one projection on said cam follower, and said resilient member urges the projection into the recess in said predetermined angular position.

6. The coupling mechanism of claim 5 including means on said projection and said recess for cooperation with the energy stored in the resilient member to impart additional rotation to the locking member relative to said one element to tighten the coupling member on said one element.

7. The coupling mechanism of claim 6 wherein said means on the projection and the recess includes an inclined cam surface partly defining said recess.

8. The coupling mechanism of claim 1 including first and second optical fibers carried by the receptacle element and the plug element, respectively, said first and second optical fibers being in optically coupled relationship when the plug element is coupled to the receptacle element.

9. The coupling mechanism of claim 1 including first and second electrical conductors carried by the receptacle element and the plug element, respectively, said first and second electrical conductors being in electrical conducting relationship when the plug element is coupled to the receptacle element.

10. The coupling mechanism of claim 1 wherein said resilient member includes a coil compression spring of flat wire having a plurality of windings of progressively increasing diameter so that when compressed, a first of the windings can be at least partially received within an adjacent one of the windings.

11. The coupling mechanism of claim 1 wherein said locking member has a passage extending through it and the coupling member is received in said passage and said resilient member is between the locking member and the coupling member.

12. The coupling mechanism of claim 11 wherein said locking member has an end portion which extends beyond said coupling member and terminates in an end of the locking member and the portion of the interlocking means that is on the locking member is at said end of the locking member.

13. A coupling mechanism comprising:
a receptacle having an open cavity therein;
a plug receivable in said cavity and held against rotation in said cavity;
a rotatable coupling member rotatably mounted on the plug;
means on said coupling member and said receptacle responsive to relative rotation between the coupling member and the receptacle for translating the coupling member on the receptacle and coupling the plug to the receptacle;
a locking member;
means for mounting the locking member on the coupling member for rotation with the coupling member and for translation relative to the coupling member;
a resilient member acting between the locking member and the coupling member for urging the locking member to translate with the coupling member as the coupling member is rotated to couple the plug to the receptacle;
cooperating means on the locking member and the receptacle for limiting the translation of the locking member with the coupling member as the coupling member is rotated to couple the plug to the receptacle until a predetermined angular position of the locking member and said receptacle is reached whereby the resilient member is progressively compressed by the rotation of the coupling member and the locking member to store energy in the resilient member; and
said cooperating means including interlocking means on the locking member and the receptacle and responsive to the stored energy in the resilient member and to the locking member and the receptacle being in said predetermined relative angular position to interlock to retain the coupling ring against rotation relative to the receptacle in a direction that would allow decoupling of the receptacle and the plug.

14. The coupling mechanism of claim 13 including means responsive to the interlocking of the interlocking means to impart additional rotation to the locking member relative to the receptacle.

15. The coupling mechanism of claim 14 wherein said means to impart includes a cam surface and a cam follower surface.

16. The coupling mechanism of claim 13 wherein the cooperating means includes a cam track on one of said receptacle and said locking member and a cam follower on the other of said receptacle and the locking member, said resilient member urges said cam track and said cam follower into engagement and said cam track has a resilient member deflection section which is configured to bring about deflection of the resilient member as the coupling member and locking member are rotated.

17. The coupling mechanism of claim 16 wherein said interlocking means includes at least one recess on said cam track and at least one projection on said cam follower, and said resilient member urges the projection into the recess in said predetermined angular position.

18. The coupling mechanism of claim 17 including means on said projection and said recess for cooperation with the energy stored in the resilient member to impart additional rotation to the locking member relative to the receptacle to tighten the coupling member on the receptacle.

19. The coupling mechanism of claim 18 wherein said means on the projection and recess includes an inclined cam surface partly defining said recess.

20. The coupling mechanism of claim 13 including first and second optical fibers carried by the receptacle and the plug, respectively, said first and second optical fibers being in optically coupled relationship when the plug is coupled to the receptacle.

21. The coupling mechanism of claim 13 including first and second electrical conductors carried by the receptacle and the plug, respectively, said first and second electrical conductors being in electrical conducting relationship when the plug is coupled to the receptacle.

22. The coupling mechanism of claim 13 wherein said locking member has a passage extending through it and the coupling member is received in said passage and said resilient member is between the locking member and the coupling member.

23. The coupling mechanism of claim 22 wherein said locking member has an end portion which extends beyond said coupling member and terminates in an end of the locking member and the portion of the interlocking means that is on the locking member is at said end of the locking member.

* * * * *